Sept. 22, 1970    V. F. CORMIER ET AL    3,530,230
ELECTRICAL SWITCH COVER PLATE
Filed March 13, 1969    2 Sheets-Sheet 1

INVENTORS
VERNON F. CORMIER
RICHARD D. HENKEN
BY Joseph C. Ryan
ATTORNEY

Sept. 22, 1970   V. F. CORMIER ET AL   3,530,230
ELECTRICAL SWITCH COVER PLATE
Filed March 13, 1969   2 Sheets-Sheet 2

VERNON F. CORMIER
RICHARD D. HENKEN
INVENTORS
BY *Joseph C. Ryan*
ATTORNEY

United States Patent Office 3,530,230
Patented Sept. 22, 1970

3,530,230
ELECTRICAL SWITCH COVER PLATE
Vernon F. Cormier, 21 Vestry St., Beverly, Mass. 01915, and Richard D. Henken, 34 Summer St., Salem, Mass. 01970
Filed Mar. 13, 1969, Ser. No. 806,846
Int. Cl. H02g 3/14
U.S. Cl. 174—66         3 Claims

ABSTRACT OF THE DISCLOSURE

A replaceable cover plate for electrical wall plug and switch outlet boxes that can be utilized with wall remodeling applications, when the wall cover around the electrical outlet box has been increased. The cover plate has two components, an outer frame member and a central control plate that can be adjusted to a depth of the added wall cover, whereby the original spacing between the outlet box and the wall plate is maintained without adjustment to the outlet box.

BACKGROUND OF THE INVENTION

This invention relates to cover plates for electrical components and more particularly to cover plates for standard electrical outlets, such as light switches and female plug electrical outlets. These electrical components are normally positioned in a conduit box secured within a wall construction, but the operational part extends through the cover plate on the outer wall surface.

FIELD OF THE INVENTION

The cover plate used in residential and commercial installations vary from one to another only in material and in the number of combination of operational openings in the plate; otherwise, they are standardized throughout industry. Primarily, the cover plate is used as a decorative covering for the electrical outlet or conduit box but it also has a practical use in that it covers the wire connections of the electrical components located within the conduit box. Other advantages are realized in providing a tight closure between the cover plate and the open end of the conduit box. The prime advantage is that combustible material, such as building paper or insulation and the like, are prevented from collecting in around the electrical components.

PRIOR ART

Normally, the standard cover plate is of rectangular shape formed from flat material stock, either of metal or various other materials. Standard mechanical stamping operations provide the plate with the required relief openings that allow access to the electrical component within the box. A basic combination of plate relief openings are utilized, such as a single rectangular orifice for a standard toggle switch, or a partial-elliptical orifice used for plug receptacles. Various combinations of each of these openings, with intermingling of the two, are used in most residential and commercial uses. There is also provided in each plate at least one accurately-positioned hole for the passage of a retainer such as a screw. The spacing and locations of the relief openings and the screw hole are standardized throughout industry so that all manufactured cover plates are interchangeable with one another. Most of the cover plates are usually formed with a slight inner cup shape that faces the wall to allow for any space variance between the edge of the electrical conduit box and the wall plate.

In residential remodeling where the originally-constructed wall surface is covered with additional decorative wall thickness such as plywood wallboard etc., it is necessary to adjust each wall outlet receptacle to match the outer surface of the new cover. Many of today's electrical outlet and switch boxes are fixed to brackets which in turn are nailed to the stud framing of the basic structure. This makes adjustment of the electrical boxes a troublesome and expensive chore.

When readjustment of these electrical conduit boxes becomes necessary, care has to be taken not to contact the live wires. The normal procedure is to disconnect the main electrical source to the outlet box. Even if this precaution is taken, the average inexperienced homeowner may not realize the potential danger in readjusting the electrical connections. Improper wiring procedures are the most frequent cause of fire in residential dwelling.

Also, as mentioned above, the spacing between the edge of the outlet box and the cover plate must be kept at a minimum to prevent accumulation of foreign materials around the electrical component.

SUMMARY OF THE INVENTION

In our improved switch cover plate, we have overcome these disadvantages in moving or adjusting the electrical conduit box by providing a unique cover plate that will compensate for the difference of new wall thickness. Our cover plate is of the same shape and has the identical operational openings as that of the standard switch plates. The major difference is that the central control area of our switch plate is a separate component and can be adjustably recessed to a depth equal to the thickness of the standard wall coverings. This allows the central body of the cover plate, i.e., that part that mates with the edge of the conduit box, to maintain the same relationship as in the original construction.

In the use of our improved cover plates, the added inconvenience of adjusting the electrical conduit box to the new wall surface is eliminated. Also, the space relationship of the original cover plate to the conduit box edge is the same as in the original wall construction. As mentioned above, this close spacing between the conduit box and the cover plate is a critical safety factor in that it prevents foreign combustible material from entering the conduit box. In operation of most electrical switches, an arcing sometimes takes place which could ignite any combustible material located in the conduit box area.

BRIEF DESCRIPTION OF THE DRAWINGS

Referring to FIG. 1 of the drawings, our electrical cover plate assembly 10 comprises two separate components, an outer main frame member 12 and a flat center control plate 14. The center control plate 14 may have a varied number of orifices depending on the function of the electrical outlet. In our drawing, we have shown for simplification, a standard rectangular orifice 26 utilized for a flip switch. The control plate also is provided with two accurately spaced-apart holes 28 and screws 29 for securing the plate to an electrical junction box 30 shown in phantom lines in FIG. 3. Both the holes 28 and the orifice 26 are accurately positioned with respect to one another so that there is no special top-to-bottom orientation. The outer frame section 12 is basically a flat frame with the walls 18 formed inwardly to define an open-ended box shape. At the rear, top and bottom edges of the inner portions of the walls, a pair of spaced-apart tabs 20 extend into the open area formed by the walls 18.

Figure 1:
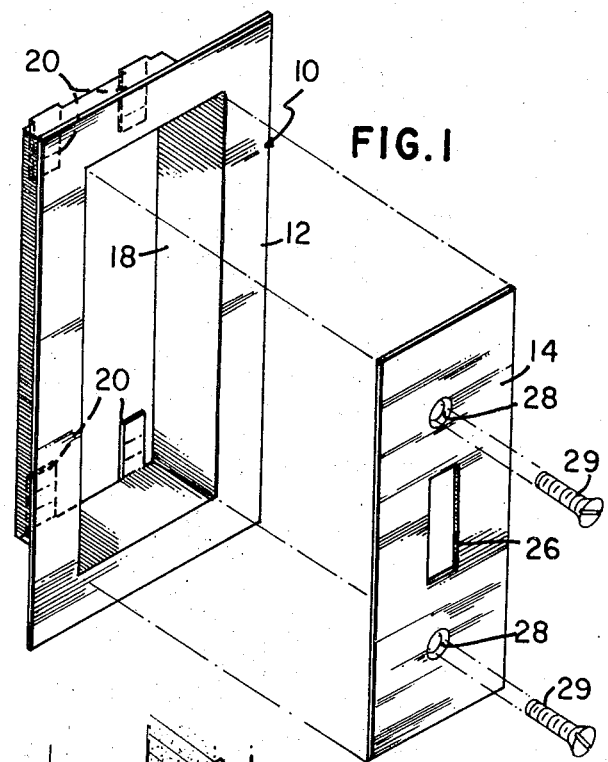
FIG. 1 is an exploded perspective view of the cover plate of the invention showing the location of the adjustable tab members in relation of the central cover portion.
Figure 2:
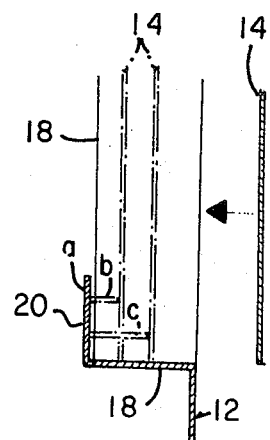
FIG. 2 is a detail of the tab stops.

As viewed in FIG. 2, the tabs 20 are scored or marked at different increments along their length. With this arrangement, the tabs can be easily bent at right angles to extend into the depth of the box to act as stops for the center control plate 14. Bending of the tabs to varying lengths allows the control plate to be spaced at different depths.

In standard wallboard application, with the use of plywood, hardboard or gypsum board, various thicknesses are used, usually from ¼ inch to approximately 1 inch. These dimensions cover most of the standard wallboard thicknesses, but an added furring strip is sometimes applied to the wall prior to applying the wallboard. With our novel adjustable control plate and tab arrangement, the full range of thicknesses can be utilized. In the drawings, especially FIG. 2, we have, for simplification, shown a tab having three stop positions, in increments of ¼ inch. The tabs can be made longer and scored differently to cover a wider range of dimensions, if necessary, that is, the tabs could be scored every ⅛ inch so that closer adjustments can be attained.

As mentioned above, the conduit box 30 is originally positioned within a prepared hole in the finished plaster wall. The front edge of the conduit box is normally flush with this finished surface. Therefore, with addition of a new wallboard cover on the plaster wall, the conduit box will then be located below the new wall surface, a distance equal to the new wallboard thickness. Normally, to bring the electrical conduit box 30 back to its original operating position, it would be necessary to enlarge the hole in the plaster wall and to remove the fasteners holding the conduit box to the studding and then move the conduit box so that its front edge is again in line with the finished wall surface. The procedure becomes unnecessary with the use of our novel adjustable wall plate cover.

Figure 3:
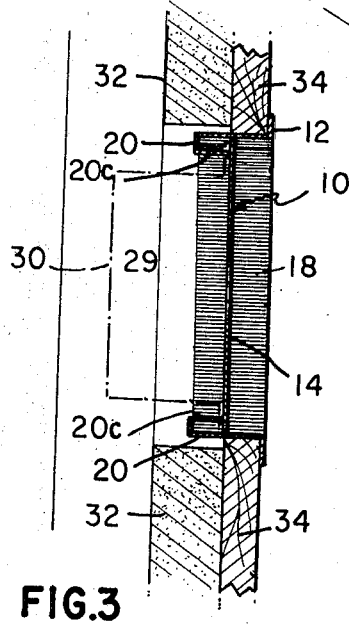
FIG. 3 is a cross-sectional view of a wall section showing, in particular, the relationship between the electrical conduit box and the new plate when the switch plate is in place.

Referring to FIG. 3, a cross-sectional view of a conduit box 30 is shown positioned with a wall. In this view, an additional thickness of wallboard 34 is positioned over the original plaster wall 32. As noted, the front surface of the conduit box 30 will be behind the surface of the added surface board. This would therefore prevent the normal switch button 40 from extending fully through the aperture 26 of the control plate 14. It would be then necessary to move the electrical conduit box out to a new position. As seen in FIG. 3, the cover plate 10 of our invention compensates for these conditions. The front edge of the frame 12 is in contact with the face of the new wall board surface 34 and the central control plate 14 is abutting the face of the conduit box 30. As it can be seen, the tabs 20 are bent so that their short legs 20c extend into the box opening of the cover. This provides a stop for the central control plate 14 and, when the screws 29 are in place, the outer frame is locked in position.

Figure 4:
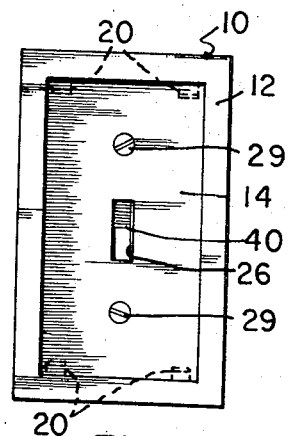
FIG. 4 is a front elevational view of the plate after assembly.

In FIG. 4, a front elevational view of that completed cover plate is shown.

As mentioned above, the tabs 20 can be so designed to provide a wider range of adaptability for different added wall surfaces.

The majority of switch plates are fabricated from thin gauge metal; but in different decorative applications, other materials, such as ceramics or plastics, are utilized.

Figure 5:
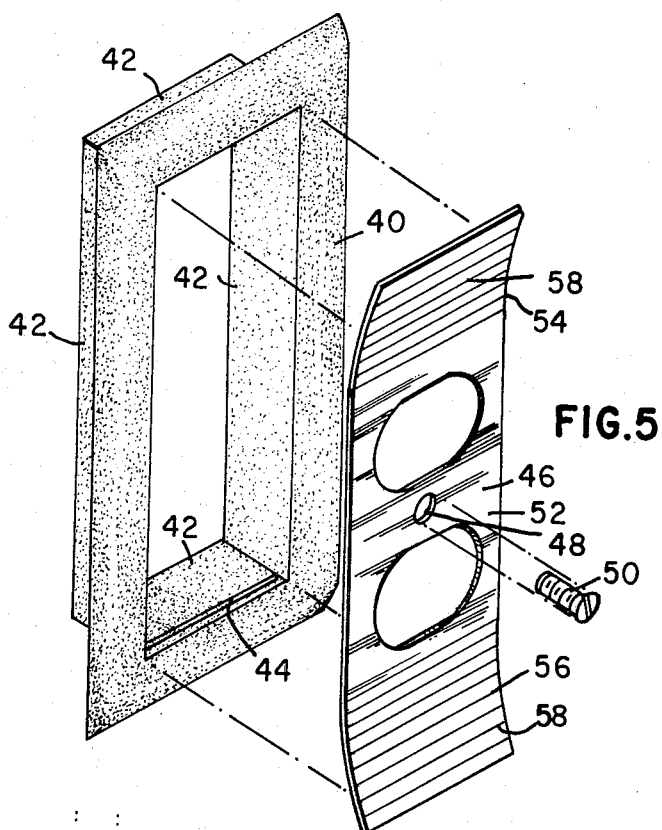
FIG. 5 is an exploded perspective view of a modification of the cover plate.
Figure 6:
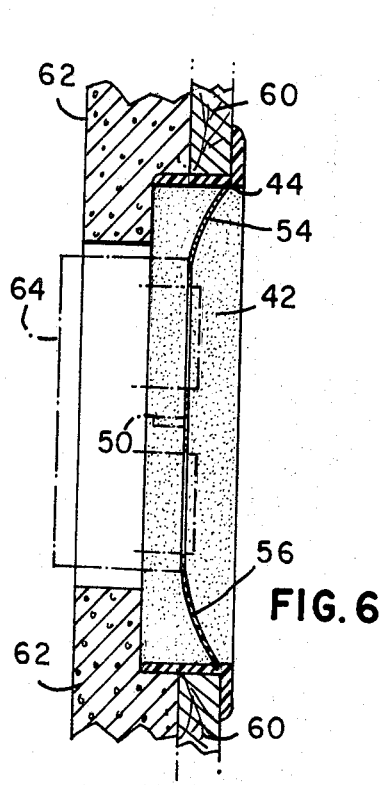
FIG. 6 is an enlarged detail of the central control plate and its fitting procedure.
Figure 7:
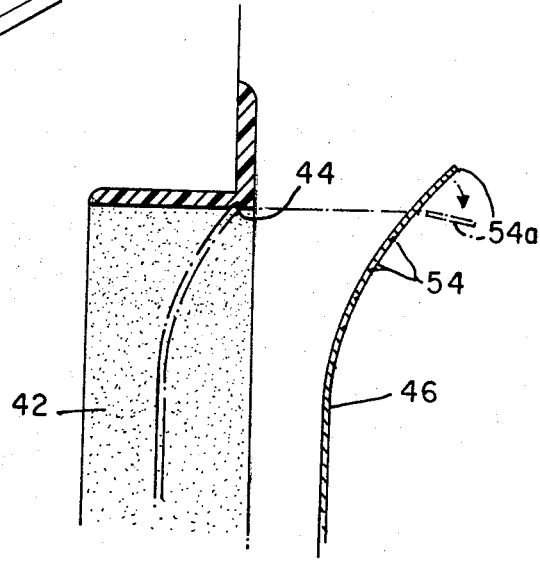
FIG. 7 is a cross-sectional view of a wall showing in particular the relationship of the modified switch cover plate to the conduit box.

In FIGS. 5, 6, and 7, a modification of a switch plate is shown. In these figures, the outer frame plate is made from material other than metal, such as ceramics that requires molding rather than stamping.

In this switch plate configuration, the outer frame 40 and sides 42 are formed as one piece to form an open-end box. On the inner top and bottom surfaces near the front edge of the outer frame, a pair of notches 44 are provided. A detail of the function of the notches can be more clearly seen in FIG. 7 where a central plate 46 is retained in a fixed position.

The control plate 46 we have shown is of a standard configuration utilized with female electrical receptacles. The plate 46 is not made from ceramics but is made from a flexible material, either a plastic or metal and has the appropriate screw hole 48 for a screw 50.

The control area of the plate 46 is made as a straight portion 52 having curved upper and lower portions 54 and 56 respectively. These curved portions are provided with scored lines 58 which can appear as a decoration, but they are utilized to control the depth of insertion of plate 46.

In FIG. 7, an enlarged cross-section is illustrated where the control plate 46 is shown prior to fitting with the cover plate 6. It can be seen that the control plate upper and lower ends 54, 56 are formed as curved arcs and for proper fitting the scored segments such as 54a can be removed, either by cutting or just by bending back and forth, depending on the material used.

In FIG. 6, a cross-sectional view of the switch plate is shown in its fixed position within a wall section. A new wall layer 60 is shown on the existing wall surface 62. A conduit box 64 fixed within the wall is in proper operating engagement with the control plate 46. The curved portions 54 and 56 are formed and cut so that their edges fit within the notches 44 on the inside edge of the cover plate 6.

With this arrangement, as well as other modifications shown in FIGS. 1–4, varied thicknesses of wall covering can be added and the proper relationship between the electrical box and the control plate will be held.

It is apparent that changes and modifications may be made within the spirit and scope of the instant invention. It is our intention, however, to be limited only by the scope of the appended claims.

What we claim is:

1. An electric switch cover plate comprising: an inner control plate; an outer frame plate having inwardly directed wall sections defining an opening within which said inner control plate is located; and adjustable means for defining the precise locus of said inner control plate within said outer frame plate.

2. The combination of claim 1 in which said adjustable means comprises a plurality of readily deformable tabs projecting inwardly from said wall section.

3. The combination of claim 1 in which said adjustable means comprises a plurality of readily deformable scored segments defining the upper and lower ends of said inner control plate.

References Cited

UNITED STATES PATENTS

| | | | |
|---|---|---|---|
| 2,630,477 | 3/1953 | Rypinski | 317—119 |
| 2,707,221 | 4/1955 | Frank. | |
| 2,886,630 | 5/1959 | Gill | 174—57 |
| 2,980,283 | 4/1961 | Bentsen | 220—24.2 |

LEWIS H. MYERS, Primary Examiner

D. A. TONE, Assistant Examiner

U.S. Cl. X.R.

174—57